| United States Patent [19] | [11] Patent Number: 4,898,964 |
| Kinoshita et al. | [45] Date of Patent: Feb. 6, 1990 |

[54] ADDITIVES FOR SYNTHETIC RESINS

[75] Inventors: Mitsuo Kinoshita, Aichi; Shigeru Imamura, Toyokawa; Hirokazu Matsueda, Toyohashi, all of Japan

[73] Assignee: Takemoto Yushi Kabushiki Kaisha, Aichi, Japan

[21] Appl. No.: 376,142

[22] Filed: Jul. 6, 1989

Related U.S. Application Data

[63] Continuation-in-part of Ser. No. 943,046, Dec. 18, 1986, abandoned.

[30] Foreign Application Priority Data

Feb. 21, 1986 [JP] Japan .................................. 61-37718

[51] Int. Cl.$^4$ .................... C07C 122/00; C07C 69/80; C07C 69/40; C07C 69/60

[52] U.S. Cl. .................................. 558/416; 558/302; 558/399; 558/406; 558/414; 558/442; 560/88; 560/89; 560/90; 560/91; 560/128; 560/196; 560/198; 560/199

[58] Field of Search ............... 558/302, 399, 406, 414, 558/416, 442; 560/88, 89, 90, 91, 128, 196, 198, 199

[56] References Cited

U.S. PATENT DOCUMENTS 4,069,384  1/1978  Meyer .................................. 560/91

Primary Examiner—Werren B. Lone
Assistant Examiner—Vera C. Clarke
Attorney, Agent, or Firm—Flehr, Hohbach, Test, Albritton & Herbert

[57] ABSTRACT

An additive for synthetic resins includes a [liquid rubber]/[polyester] block copolymer comprising block liquid rubber compound parts and block polyester parts as constituent segments. One or more of these polyester blocks are connected to each one of the polydiene block parts through ester bond.

10 Claims, No Drawings

ADDITIVES FOR SYNTHETIC RESINS

This is a continuation-in-part of application Ser. No. 943,046 filed Dec. 18, 1986, now abandoned.

BACKGROUND OF THE INVENTION

This invention relates to additives for synthetic resins and more particularly to additives for thermosetting or thermoplastic synthetic resins containing [polydiene]/[polyester] block copolymers (hereinafter referred to as PD-PES block copolymers).

Although many kinds of thermosetting and thermoplastic synthetic resins are widely used as residential building materials such as for bath tubs and purification tanks, as industrial materials such as for machines and electrical products, as materials for transportation machines such as automobiles and railroad wagons and further as storage tanks and containers, it is a common practice, when they are used for processing, to add other types of synthetic resins, fillers, fiber-reinforcing materials, etc. to improve their physical characteristics such as mechanical strength. It is particularly important to improve their impact strength when their products are used for construction purposes. For this reason, it has been known to blend rubber materials and other polymers in addition to many kinds of reinforcing materials, depending on the purpose for which the material will be used.

It has also been known to blend rubber materials and other thermoplastic synthetic resins in unsaturated polyesters which are examples of thermosetting synthetic resins because their volumes become reduced by 7-10% at the time of molding such that external appearance and accuracy in measurements of their molded products are adversely affected. Among the well known rubber materials which are used for improving impact strength and reducing mold shrinkage as mentioned above, there are polybutadienes, butadiene-styrene copolymers, butadieneacrylonitrile copolymers, butadiene-styrene-acrylonitrile copolymers and modified polybutadienes.

Synthetic resins which are principally used for reinforced plastics with improved impact strength are commonly referred to as matrix resins. As matrix resins, thermosetting unsaturated polyester resins and thermoplastic resins such as polyethylene terephthalate, polybutylene terephthalate, polycarbonate, polyamide, etc. are widely used for such purposes. Reinforced plastics are produced by adding a rubber-type substance, a reinforcing material, a pigment, a filler, etc. to these synthetic resins and applying many kinds of molding processes.

Since matrix resins and rubber materials are so different from each other in physical characteristics such as polarity and solubility parameters, it is extremely difficult to mix them together uniformly or to disperse them stably. Molded products obtained from an unstably mixed thermosetting synthetic resin compound have imperfect surface conditions. Indentations and protrusions are observable and rubber materials may appear on the surface. Desired mechanical strength is not achieved and shrinkage is not reduced. If use is made of an unstably dispersed thermoplastic synthetic resin compound, furthermore, one of the components may coagulate at the time of molding. This affects the molding characteristics adversely and increases the fluctuations in the physical characteristics of molded products.

For reasons stated above, it has been desired to develop additives which can uniformly mix with and stably disperse in thermosetting or thermoplastic matrix resins. They must have good molding characteristics so that products with superior surface qualities can be manufactured, besides being able to improve the mechanical strength of the molded products and to reduce their shrinkage. The present invention therefore relates to additives for synthetic resins which will satisfy these requirements.

Many ideas have been advanced for improving compatibility and/or dispersibility with thermosetting or thermoplastic synthetic resins. For molding the rubber material to be added, graft polymerization of a rubber material with another monomer such as styrene, maleic acid, methacrylates, acrylates, etc. has been considered (for example, Japanese Patent Publications Tokkai No. 54-18862 and 54-40846). Their graft efficiency is not high and their compatibility and dispersibility are not satisfactorily high. For improving compatibility with thermosetting synthetic resins, styrene-type block copolymers have been considered (Japanese Patent Publications Tokkai Nos. 53-74592 and 60-99158). Although compatibility can be improved to a certain extent by them, they are not desirable from the points of view of shrinkage and impact strength since use is made of styrene-type polymers which basically lack strength. Rubber modification of unsaturated polyester resins has also been considered such as the Diels-Alder addition of conjugate diene products such s dicyclo-pentadiene to the double bond of unsaturated polyester containing $\alpha$, $\beta$-unsaturated dicarboxylic acid (Japanese Patent Publication Tokkai No. 58-2315). Although improved compatibility with unsaturated polyester resins can be expected because the amount of conjugate diene-type products which are added is small, it is not effective from the points of view of shrinkage and impact strength.

SUMMARY OF THE INVENTION

It is therefore an object of the present invention to provide block copolymers as additives for synthetic resins which can eliminate the aforementioned problems and satisfy the requirements described above.

The present invention has been accomplished by the present inventors who discovered that PD-PES block copolymers having as segments polydiene block and polyester block satisfy the desired conditions.

DETAILED DESCRIPTION OF THE INVENTION

In summary, the present invention discloses additives for synthetic resin materials characterized as containing a block copolymer of the form $X-Y)_n$ where X is polydiene block or hydrogenated polydiene block; Y is polyester block having connected by ester linkage one or more types of organic dicarboxylic anhydride and one or more types of 1,2-epoxide selected from the group consisting of ethylene oxide, propylene oxide and butylene oxide; X and Y are connected by ester linkage; n is an integer equal to or greater than 1; and $X-Y)_n$ is formed by starting with carboxyl group or hydroxyl group in polydiene or hydrogenated polydiene and by alternate condensation of the organic dicarboxylic anhydride and 1,2-epoxide therewith in the presence of a catalyst.

PD-PES block copolymers of this invention can be produced stably in an industrially advantageous manner by starting with a polydiene or hydrogenated polydiene having within its molecule a reactive group such as a hydroxyl group, or a carboxyl group and reacting it with organic dicarboxylic anhydride and 1, 2-epoxide in the presence of a catalyst to introduce a polyester chain through the reactive group of the polydiene or hydrogenated polydiene. Polyester chain is formed in this reaction because hydroxyl group is formed by the open-ring addition of 1, 2-epoxide to a carboxylic group formed by the reaction between hydroxyl group and an organic dicarboxylic anhydride and an organic dicarboxylic anhydride is further added to it. Thus, a polyester chain is formed in this reaction because the esterification reaction between an hydroxyl group and an organic dicarboxylic anhydride and the open-ring addition reaction between an carboxyl group and 1, 2-epoxide take place alternately and sequentially.

The polydiene or hydrogenated polydiene which may be used in the aforementioned process include diene homopolymers having an active hydrogen group such as a hydroxyl group, an imino group and a carboxyl group as mentioned above. One or more of such active hydrogen groups may be either in a polydiene chain or at its ends. The position or positions in the polydiene chain at which such active hydrogen group or groups are introduced do not limit the present invention; nor is the present invention limited with respect to stereoisomers and structural isomers of the polymers or the polymerization method such as radical polymerization, anion polymerization and anion living polymerization. Monomer diene compounds which constitute the aforementioned polydiene include butadiene, isoprene, chloroprene, 1, 3-pentadiene and cyclopentadiene.

Examples of modified polydienes which may be used advantageously in the aforementioned reaction include α, ω-1, 2-polybutadiene glycol (Nisso PB-G series), α, ω-1, 2-polybutadiene dicarboxylic acid (Nisso PB-C series), α, ω1, 2-polybutadiene glycol mono-maleate (Nisso PB-GM series, the above three produced by Nippon Soda, Inc.), end carboxyl modified 1, 4-polybutadiene (Hycar CTB series produced by Ube Kosan, Inc. or B.F. Goodrich, Inc.) and end hydroxyl modified 1, 4-polybutadiene (Poly-bd R-45M or R-45HT produced by Idemitsu Sekiyu Kagaku, Inc. or Arco Chemical, Inc.). As a polydiene having active hydrogen group, use may be made of any of the aforementioned polydienes hydrogenated either partially or completely to the carbon-carbon double bond in its principal or side chain. Examples thereof include hydrogenated α, ω-1, 2-polybutadiene glycol (Nisso PB-GI series produced by Nippon Soda, Inc.) and hydrogenated α, ω-1, 2-polybutadiene dicarboxylic acid (Nisso PB-CI series produced by Nippon Soda, Inc.).

Examples of organic dicarboxylic anhydride which may be used in the aforementioned reaction include aliphatic dicarboxylic anhydrides such as succinic anhydride, maleic anhydride and alkenyl succinic anhydride, aromatic dicarboxylic anhydrides such as phthalic anhydride and naphthalene dicarboxylic anhydride and alicyclic dicarboxylic anhydride such as cyclohexane dicarboxylic anhydride, cyclohexene dicarboxylic anhydride and end methylene cyclohexane dicarboxylic anhydride.

Examples of 1, 2-epoxide which may be used in the aforementioned reaction include aliphatic epoxides such as ethylene oxide, propylene oxide an ( 1, 2-butylene oxide. Examples of catalyst to be used in the aforementioned reaction include lithium halides such as lithium chloride and lithium bromide and tetra alkyl quaternary ammonium salts such as tetramethyl ammonium bromide and tetrapropyl ammonium chloride. It goes without saying that these examples mentioned above are not intended to limit the scope of the present invention.

Next, an illustrative method of advantageously producing PD-PES block copolymer of the present invention is described more in detail. In the presence or absence of an inactive solvent, predetermined amounts of organic dicarboxylic anhydride and catalyst per mole of polydiene or hydrogenated polydiene having hydroxyl or carboxyl group are placed inside a reactor vessel and another predetermined amount of 1, 2-epoxide is introduced under atmospheric or elevated pressure. The mixture is caused to react at 50°–200° C., or preferably at 120°–150° C. to obtain PD-PES block polymer.

The end groups of the polyester chains in the block copolymers of the present invention thus produced are usually hydroxyl groups, carboxyl groups or their mixture. The ratio of hydroxyl and carboxyl groups as end groups depends on the molar ratio between organic carboxylic anhydride and 1, 2-epoxide which participate in the reaction. In other words, the ratio between hydroxyl and carboxyl groups as end groups can be varied by properly selecting the molar ratio between these reactants.

The aforementioned hydroxyl and/or carboxyl groups as end groups serve to cause reactions with substances which can react with them. Thus, various reactive groups such as vinyl groups, epoxy groups and isocyanate groups can be added through connecting groups such as ether and ester bonds, thereby contributing to end modifications.

Methods of introducing vinyl group include those by acylation through reaction of ethylenically unsaturated acid halide such as acrylic acid halide and methacrylic acid halide and those by a ring-opening addition reaction of epoxy group by using a substance containing within its molecule both an ethylenically unsaturated hydrocarbon group and an epoxy group such as arylglycidyl ether and glycidyl methacrylate.

One of the methods of introducing isocyanate group is by reacting 1 mole of a multifunctional isocyanate compound such as diisocyanate or triisocyanate compound with 1 mole of end hydroxy group and introducing isocyanate group through urethane bond.

One of the methods of introducing carboxyl group is to react dicarboxylic acid, polybasic acid (bivalent or greater) or their anhydride with end hydroxyl group. Examples of dicarboxylic anhydride which may preferably be used include succinic anhydride, maleic anhydride, phthalic anhydride and hexa-hydrophthalic anhydride. Moreover, inactive modifications can be effected by closing the end hydroxyl or carboxyl groups through ether, ester or amide bonds. The end carboxyl group can be inactivated, for example, by modifying such carboxyl groups into salts of an alkali or alkaline earth metal.

Regarding the end groups of PD-PES block copolymers of the present invention, magnesium oxide and isocyanates are used for increasing viscosity when sheet molding components (SMC) and bulk molding compounds (BMC) are manufactured. For gaining stability in unsaturated polyester resin premix as molding materials and improving physical characteristics of the molded objects obtained therefrom, the ratio of carboxyl groups as end groups should be increased when magnesium oxide is used and the ratio of hydroxyl groups as end groups should be increased when diisocyanates are used. Those which have undergone reactive end modifications as described above are frequently very effective for improving the physical characteristics of the molded products because chemical bonds are formed between them and matrix resins or various fillers and crosslinking agents. Those which have undergone inactive end modifications as described above, on the other hand, are frequently effective in improving compatibility with matrix resins or chemical stability.

The PD-PES block copolymers of this invention have particularly superior characteristics as additives for improving impact strength of molded products using thermosetting resins and various thermoplastic resins as matrix resin and/or reducing their shrinkage at the time of molding. It is because the PD-PES block copolymers of the present invention have more uniform and stable compatibility or dispersibility with matrix resins than the rubber-like substances and thermoplastic resins which have been used conventionally for similar purposes. PD-PES block copolymers having desired characteristics can be obtained by varying the molecular weights, structures and compositions of their polydiene block and polyester blocks as well as the ratio between their molecular weights. The molecular weight of the polydiene block of this invention is in the range between 1000 and 50,000 and preferably between 1000 and 5000. The number of polyester block or blocks connected to a polydiene block is from 1 to 10, and preferably from 2 to 5. Compatibility and dispersibility with matrix resins can be improved generally by increasing the molecular weight of the polyester block relative to the polydiene block. More particularly, desired characteristics can be made available by appropriately changing the kinds of organic dicarboxylic anhydride and 1, 2-epoxide constituting the polyester block as well as the ratio therebetween, depending on the kind of matrix resin. If the ratio of the polyester is increased, on the other hand, the surface characteristics of the molded products are not necessarily improved although compatibility with matrix resins becomes extremely good. In order to improve both compatibility or dispersibility with matrix resins and the surface characteristics of the molded products, therefore, the ratio between the polydiene block and the polyester block is critical. This is also influenced by the structure of each part as well as the kind of matrix resin.

When the PD-PES block copolymers of the present invention are used as an additive for the purpose of improving impact strength and reducing shrinkage at the time of molding, therefore, it is advantageous that the ratio between the polydiene block part be between 10 and 95 weight %. It is particularly advantageous that this ratio be between 40 and 90 weight % when use is made against thermosetting synthetic resins. If the ratio of polyester block is less than 5 weight %, dispersibility with matrix resins is poor.

In the above, the main characteristics of PD-PES block copolymers were explained as additives but these block copolymers can be used extremely well also for stably dispersing other types of thermoplastic resin which are not compatible with matrix resins.

The additives of the present invention include mixtures of PD-PES block copolymers with appropriate amounts of elastomers or prepolymers which are thermosetting synthetic resin materials, thermoplastic resins, monomers with vinyl polymerization characteristics, organic solvents, plasticizers, organic or inorganic bulk-increasing materials, fiber reinforcing materials, etc. When PD-PES block copolymers are applied to thermosetting unsaturated polyester resins, in particular, it is extremely convenient if they are diluted appropriately with a monomer with vinyl polymerization characteristics such as styrene, methyl styrene, methyl methacrylate, etc.

In what follows, examples of PD-PES block copolymers and their evaluations are presented to more clearly describe the present invention.

EXAMPLES

Production (Example No. 1: Referred to as B in Table 1 below)

Inside an autoclave were placed 52.3g (0.35 moles) of phthalic anhydride, 82.5 g (0.825 moles) of succinic anhydride, 0.7 g of lithium chloride as catalyst and 715 g (0.5 moles) of α, ω-1, 2-polybutadiene glycol (Nisso PB-G1000 with average molecular weight of 1430 produced by Nippon Soda, Inc.) and after nitrogen gas was introduced into the reacting system, the mixture was heated to 130° C. with stirring. Next, 42.7 g (0.74 moles) of propylene oxide was compressed in over a period of one hour. The reaction was completed after aging at 130° C. for two hours and 890 g of yellowish transparent viscous product was obtained. The molecular weight of the polybutadiene-polyester block copolymer thus obtained was 1786 (hereinafter all molecular weights are calculated values), the ratio of its polydiene segment was 80.0 weight % (hereinafter written simply as %), its acid value was 27 and its hydroxyl value was 38.

A yellowish transparent styrene solution containing 80% of block copolymer was obtained by adding 200 g of styrene monomer of 0.1 g of hydroquinone to 800 g of the block copolymer.

Production (Example No. 2: Referred to as J in Table 2 below)

Inside a flask were placed 800 g (0.448 moles) of the block copolymer of Production Example No. 1 described above and 54.2 g (0.54 moles) of succinic anhydride for a reaction at 120°-125° C. for two hours in a nitrogen reflux. After the content was cooled to 50° C., it was dissolved by adding 200 g of styrene monomer. The acid value of the styrene solution containing block copolymer was 50.7 and its hydroxyl value was 1.9. Polybutadiene-polyester block copolymer with carboxyl-modified ends of polyester chains was obtained.

Production (Example No. 3: Referred to as L in Table 2 below)

Placed inside a flask were 800 g (0.448 moles) of the block copolymer of Production Example No. 1 described above, 4 g of boron trifluoride ether complex as catalyst and 1 g of hydroquinone as polymerization inhibitor, and 146.2 g (1.03 moles, or 15% in excess of calculated value) of glycidyl methacrylate were gradually dropped for reaction at 50°-60° C. After the dropping was completed, the reaction was continued for 2 hours at 70°-80° C. and a block copolymer with methacryloxy group at an end was obtained.

The molecular weight of the block copolymer thus obtained was 2070 and the content of polyester block inclusive of reactive groups was 31.0 weight %

Production (Example No. 4: Referred to as M in Table 2 below)

Placed inside a flask were 800 g (0.448 moles) of the block copolymer of Production Example No. 1 described above, 156 g (0.896 moles) of toluilene diisocyanate and 450 ml of toluene for reaction at 70°–80° C. for 3 hours with heating and stirring. Toluene was thereafter distilled away under reduced pressure to obtain a block copolymer having isocyanate group as end group.

The molecular weight of the block copolymer thus obtained was 2134 and the content of polyester block inclusive of reactive groups was 33.0 weight %.

Test No. 1 (PD-PES block copolymers)

PD-PES block copolymers shown in Table 1 were obtained as described in Production Example No. 1.

TABLE 1

| Kind | Polydiene Molecular Wt | Polyester Chain Forming Component | | Molecular Wt of PD-PES Block Copolymer | Ratio of Polydiene Segment (%) | End Group Molar Ratio |
| --- | --- | --- | --- | --- | --- | --- |
| | | *1 Molar Ratio | *2 | | | |
| A | *3 1430 | SA/PA 7/3 | PO | 1505 | 95.0 | COOH/OH 40.3/59.7 |
| B | Same as above | Same as above | Same as above | 1786 | 80.0 | Same as above 41.5/58.5 |
| C | Same as above | Same as above | Same as above | 2073 | 69.0 | Same as above 41.8/58.2 |
| D | Same as above | Same as above | Same as above | 2763 | 51.8 | Same as above 40.4/59.6 |
| E | Same as above | Same as above | Same as above | 4142 | 34.5 | Same as above 42.9/57.1 |
| F | Same as above | SP/PA/MA 5.5/3.0/1.5 | Same as above | 1786 | 80.0 | Same as above 49.3/50.7 |
| G | *4 1520 | SA/PA 7/3 | PO | 2017 | 75.0 | COOH/OH 48.0/52.0 |
| H | *5 4800 | HA/PA 7/3 | Same as above | 5392 | 89.0 | Same as above 30.0/70.0 |
| I | *6 3500 | HA/TA/MA 6.4/1.6/2.0 | EO | 404 | 86.6 | Same as above 35.5/64.5 |

Notes:
*1 Organic dicarboxylic anhydride
*2 Epoxide
*3 α, ω-1, 2-polybutadiene glycol (Nisso PB-G1000 produced by Nippon Soda, Inc.).
*4 α, ω-1, 2-polybutadiene dicarboxylic acid (Nisso PB-C1000 produced by Nippon Soda, Inc.).
*5 End carboxyl modified 1, 4-polybutadiene (Hycar CTB produced by Ube Kosan, Inc.).
*6 End carboxyl modified 1, 4-polybutadiene acrylnitrile block copolymer (Hycar CTB containing 8 molar % of acrylnitrile produced by Ube Kosan, Inc.).
SA: Succinic anhydride
PA: Phthalic anhydride
MA: Maleic anhydride
HA: Cyclohexane dicarboxylic anhydride
TA: Cyclohexane dicarboxylic anhydride
PO: Propylene oxide
EO: Ethylene oxide

TABLE 2

| Kind | Modifying Agent | Structure of End Group |
| --- | --- | --- |
| J | Succinic anhydride | —COOH |
| K | Same as above | —COOH |
| L | Glycidyl Methacrylate | $CH_2{=}C{-}COO{-}$<br>$\quad\quad\ \ |$<br>$\quad\quad\ \ CH_3$ |
| M | Toluilene di-isocyanate | *7 |
| N | Epichlorohydrine | $CH_2{-}CH{-}CH_2{-}$<br>$\quad\ \ \backslash\quad\ /$<br>$\quad\quad\ O$ |
| O | Methylchloride | $CH_3O{-},\ CH_3O\overset{\overset{O}{\|}}{C}{-}$ |
| P | Ca(OH)$_2$ | Calcium |

Test No. 2 (End modified PD-PES block copolymers)

End modified PD-PES block copolymers were obtained from B of Table 1 (except for K in Table 2 which was obtained from F in Table 1).

TABLE 2-continued

| Kind | Modifying Agent | Structure of End Group |
|------|----------------|------------------------|
|      |                | carboxylate            |

Note:

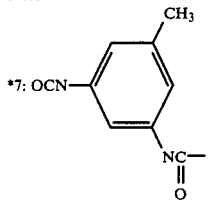

*7: OCN—⟨C6H4(CH3)⟩—NC=O

Evaluation No. 1

Placed in a beaker were 60 weight parts of a styrene solution of unsaturated polyester resin containing 60% of solid component (Polyset 9107 produced by Hitachi Kasei, Inc.: phthalic ester type), 27 weight parts of styrene monomer and 13 weight parts of an additive listed in Table 3. After the mixture was made uniform and stirred by a propeller stirrer for 5 minutes, it was moved into a 100 ml measuring cylinder and its phase separation (volume %) was measured over a period of time while it was left quietly at room temperature. The results are shown in Table 3.

TABLE 3

| Additive | Condition Immediately After Resting Quietly | After 20 Minutes | After One Hours | After Six Hours | After 24 Hours |
|----------|---------------------------------------------|------------------|-----------------|-----------------|----------------|
| A | White turbid dispersion | 0 | 0.5 | 3 | 10 |
| B | White turbid dispersion wtih small particles | 0 | 0 | 1 | 3 |
| C | Nearly soluble minute dispersion | 0 | 0 | 0 | 0 |
| D | Soluble Condition | 0 | 0 | 0 | 0 |
| E | Dissolved | 0 | 0 | 0 | 0 |
| PBG | Separation into two layers | 12 | 12 | 13 | 13 |
| SBS | White turbid dispersion - partial separation | 5 | 12 | 13 | 14 |
| SES | White turbid dispersion | 2 | 10 | 12 | 13 |

Notes:
A-E: as in Table 1
PBG: α, ω-1, 2-polybutadiene glycol (Nisso PB-G1000 produced by Nippon Soda, Inc.
SBS: Styrene-type block copolymer (Califlex TR1102 produced by Shell Chemical, Inc.)
SES: Styrene-type block copolymer obtained by suspension polymerization of end modified polyester with styrene monomer (proposed in Example No. 1 of Japenese Patent Publication Tokkai 60-99158)

Evaluation No. 2

Placed inside a Banbury mixer were 40 weight parts of 33% styrene solution of J in Table 2, 60 weight parts of unsaturated polyester resin (Yupika 7507 produced by Nippon Yupika, Inc.), 1.5 weight parts of tertiary butyl perbenzoate and 3.0 weight parts of zinc stearate. To this was added 200 weight parts of calcium carbonate powder and after the mixture became uniform, 60 weight parts of glass fibers with fiber length ½ inches were added. One minute later, the mixer was stopped and the premix thus obtained was molded at 145° C. Surface lustre was observed on the molded sheet. Its shrinkage by molding was 0.005%.

When the premix using PBG of Table 3 was substituted for J, the surface luster of molded sheet was extremely irregular.

Evaluation No. 3

Mixed together were 40 weight parts of 33% styrene solution of the additives listed in Table 4, 60 weight parts of unsaturated polyester resin (Polyset 9120 produced by Hitachi Kasei, Inc.), 3 weight parts of zinc stearate, 1.5 weight parts of tertiary butyl perbenzoate, 140 weight parts of calcium carbonate powder and 0.3 weight parts of parabenzoquinone. To this were added 2 weight parts of magnesium oxide and a composition containing 10% of glass fibers of length 1 inch was produced immediately. This was molded into a mold and heated for molding at mold temperature of 140° C. to obtain an SMC. Its surface lustre was examined visually and its shrinkage rate was obtained. The results are shown in Table 4.

TABLE 4

| Additive | Surface Lustre | Shrinkage Rate Upon Molding (%) |
|----------|---------------|--------------------------------|
| A | b | −0.10 |
| B | a–b | −0.07 |
| C | a | −0.02 |
| D | a | 0.06 |
| E | a | 0.12 |
| PBG | c | −0.20 |
| PBA | c | −0.18 |
| SES | b | 0.25 |

Notes:
A-E, PBG, SES: As explained above.
PBA: α, ω-1, 2-polybutadiene dicarboxylic acid (Nisso PB-C1000 produced by Nippon Soda, Inc.)
Evaluation: (a) = Good lustre
(b) = Not very good lustre
(c) = No lustre

Evaluation No. 4

Polybutylene terephthalate resin (relative viscosity of 0.5% orthochlorophenol solution at 25° C.: 1.70) and additive of Table 5 were mixed at weight ratio of 90/10 and pellets were produced by melting and kneading by means of an extruder having a vent with diameter of 30 mm. After the pellets thus obtained were dried in vacuum, molded products were obtained by injection molding. Izod impact strength (with notches) was measured of these products (ASTM-D256-56) and the dispersion of additives in the matrix resin was observed with an electron microscope. The results are shown in Table 5.

When PBA was used with reference to Table 5, there were free rotations of the extruder screw during the pellet-forming process caused by incomplete kneading and a small amount of coagulated PBA spilled out of the vent opening.

TABLE 5

| Additive | Izod Impact Strength | Dispersion Condition |
|----------|---------------------|----------------------|
| A | 7.9 | Fine Dispersion |
| B | 8.4 | Same as above |
| C | 8.2 | Same as above |
| D | 7.5 | Extremely fine dispersion |
| E | 6.8 | Extremely fine dispersion - completely compatible |
| PBA | 2.5~3.2 | Fine-bulk |
| SES | 2.8 | Fine dispersion |

TABLE 5-continued

| Additive | Izod Impact Strength | Dispersion Condition |
|---|---|---|
| None | 3.0 | — |

Notes:
A-E, PBA, SES: As explained above
Range regarding PBA indicates fluctuations, depending on the position.

Evaluation No. 5

The PD-PES block copolymers listed in Table 2 were measured and observed as explained above in connection with Evaluation No. 4 and comparisons were made with N of Table 1. The results are shown in Table 6. The added amount of additives was 12.5%.

TABLE 6

| Additive | Izod Impact Strength | Dispersion Condition |
|---|---|---|
| B | 8.4 | Fine dispersion |
| N | 9.0 | Same as above |
| O | 8.6 | Same as above |

As can be understood from the Examples and Evaluations presented above, the additives of the present invention include [polydiene]/[polyester] block copolymers which have the characteristics of both polydiene and the polyester polymers or affinity to both and have never been considered before. They provide superior molding workability and molded products with superior surface quality, improved mechanical strength and reduced shrinkage rate can be obtained.

What is claimed is:

1. An additive for synthetic resins containing a block copolymer of the form. $X-Y)_n$ where
   X is polybutadiene block, hydrogenated polybutadiene block, polyisoprene block or hydrogenated polyisoprene block with molecular weight of 1000–50000, occupying 10–95 weight % of said block copolymer,
   Y is polyester block having connected ester linkage one or more types of organic dicarboxylic anhydride and one or more types of 1,2-epoxide selected from the group consisting of ethylene oxide, propylene oxide and butylene oxide,
   X and Y are connected by ester linkage,
   n is an integer between 1 and 10, and
   $X-Y)_n$ is obtained by starting with carboxyl group or hydroxyl group in polybutadiene, hydrogenated polybutadiene, polyisoprene or hydrogenated polyisoprene and by alternate condensation of said organic dicarboxylic anhydride and said 1,2-epoxide therewith in the presence of a catalyst.

2. The additive of claim 1 wherein at least one of said organic dicarboxylic anhydride is selected from the group which consists of phthalic anhydride, succinic anhydride, maleic anhydride, cyclohexane dicarboxylic anhydride, cyclohexene dicarboxylic anhydride and end methylene cyclohexene dicarboxylic anhydride.

3. The additive of claim 1 wherein at least one of said polyester blocks has a reactive group selected from the group consisting of vinyl group, isocyanate group and carboxylic acid group.

4. The additive of claim 3 wherein said reactive group is a vinyl group formed by reacting an ethylenically unsaturated carboxylic acid halide or an epoxy compound having an ethylenically unsaturated group with an end hydroxyl group of said polyester block or blocks.

5. The additive of claim 4 wherein said epoxy compound is glycidyl methacrylate.

6. The additive of claim 3 wherein said reactive group is an isocyanate group formed by reacting a multifunctional isocyanate compound selected from the group consisting of diisocyanate and triisocyanate with an end hydroxyl group of said polyester block or blocks.

7. The additive of claim 6 wherein said multifunctional isocyanate compound is toluilene diisocyanate.

8. The additive of claim 3 wherein said reactive group is a carboxylic acid group formed by reacting dicarboxylic acid, tricarboxylic acid or an anhydride thereof with an end hydroxyl group of said polyester block.

9. The additive of claim 8 wherein said anhydride is maleic anhydride, succinic anhydride or phthalic anhydride.

10. The additive of claim 1 wherein at least one of said polyester blocks has an inactive group selected from the group consisting of acetyl group and methyl group.

* * * * *

UNITED STATES PATENT AND TRADEMARK OFFICE
CERTIFICATE OF CORRECTION

PATENT NO. : 4,898,964
DATED : February 6, 1990
INVENTOR(S) : Mitsuo Kinoshita, et al.

It is certified that error appears in the above-identified patent and that said Letters Patent is hereby corrected as shown below:

Column 2, lines 54 and 61, change "X-Y)$_n$" to --X(Y)$_n$--.

Column 3, line 21, delete ", an imino group".

Column 3, line 66, delete "(".

Signed and Sealed this

Fourth Day of December, 1990

Attest:

HARRY F. MANBECK, JR.

Attesting Officer     Commissioner of Patents and Trademarks